United States Patent [19]

Kline

[11] Patent Number: 5,011,074
[45] Date of Patent: Apr. 30, 1991

[54] THERMOSTATIC MIXING VALVE WITH THERMOSTAT FAILURE COMPENSATION

[75] Inventor: Kevin B. Kline, Indianapolis, Ind.
[73] Assignee: Lawler Manufacturing Co., Inc., Indianapolis, Ind.
[21] Appl. No.: 556,128
[22] Filed: Jul. 20, 1990
[51] Int. Cl.⁵ .............................................. G05D 23/13
[52] U.S. Cl. ................................ 236/12.13; 236/12.2; 236/DIG. 2
[58] Field of Search ............ 236/DIG. 2, 12.13, 12.15, 236/12.2; 137/606, 614.21

[56] References Cited

U.S. PATENT DOCUMENTS

| | | | |
|---|---|---|---|
| 2,387,792 | 10/1945 | Holmes | 236/DIG. 2 |
| 3,001,717 | 9/1961 | Rimsha et al. | 236/12.13 |
| 4,165,034 | 8/1979 | Rogers, Jr. et al. | 236/12.2 |
| 4,475,684 | 10/1984 | Garlick et al. | 236/DIG. 2 |

Primary Examiner—William E. Tapolcai
Attorney, Agent, or Firm—Woodard, Emhardt, Naughton, Moriarty & McNett

[57] ABSTRACT

A thermally controlled mixing valve assembly includes a valve body having a hot fluid inlet, a cold fluid inlet, a fluid mixing chamber, and a fluid outlet in communication with the mixing chamber. A thermally responsive control member, or thermostat, is disposed within the mixing chamber. A cylindrical liner is situated within the valve body with slots for cold fluid flow and an opening at the bottom of the liner for hot fluid flow. Concentrically located piston and valve disc are connected through an actuator to the thermostat so that the piston and disc move according to the thermostat response to the fluid temperature in the mixing chamber. The piston controls flow through the cold fluid slots while the disc controls flow through the hot fluid opening in the liner. Also connected to the actuator is a back-seat which is situated opposite the valve disc across the hot fluid opening. A spring biases the back-seat, as well as the actuator assembly, upward against the downward motion of the thermostat. In the event of a failure of the thermostat, the bias spring pushes the back-seat upward until the back-seat closes the hot fluid opening in the liner, thereby terminating hot fluid flow into the mixing chamber. Bleed orifices may be provided in the back-seat to permit restricted hot fluid flow. The liner and piston dimensions can be calibrated to permit restricted cold fluid flow even when the liner covers the cold fluid slots in the liner.

6 Claims, 5 Drawing Sheets

THERMOSTATIC MIXING VALVE WITH THERMOSTAT FAILURE COMPENSATION

BACKGROUND OF THE INVENTION

The present invention concerns thermostatic or thermally controlled fluid mixing valves. In particular, the invention concerns a mixing valve having means for compensating for the failure of the thermstat element or thermally responsive control member.

Thermally controlled or thermostatic mixing valves are well known. Many such fluid mixing valves include a single control knob that can be rotated to vary the temperature of the output fluid between "off", "cold" and "hot" positions. A valve member is controlled by a thermally responsive control member, or thermostat, to maintain the fluid temperature according to the setting of the control knob.

Thermally operated mixing valves are frequently used to control the temperature water through the shower fitting. Other applications include an emergency eye-wash fountain in which tepid water is provided for washing the eyes of a victim of some contamination. In both cases, it is important that the mixing valve properly operate to maintain the pre-set temperature of the flow of liquid from the valve. In many cases, the mixing valve maintains the temperature of the output liquid to within plus or minus 2° F. of the pre-set temperature.

In an application of mixing valves in which the output fluid is in contact with a user, it is critical that some form of emergency shut-off be provided in the event of a failure of at least the cold fluid source. In the absence of such an emergency mechanism, the user may be scalded by the hot water flowing exclusively through the valve in the absence of cold mixing water, during the lag before the thermostat functions to shut the valve off. In other applications, such as the eye-wash application, it is also important that the mixing valve has some means for maintaining some flow of liquid through the valve in the event of a failure of the valve or thermal control member. In the eye-wash application, it is imperative that at least some cold water flow is maintained, otherwise the victim may suffer serious injury for failure to wash the eye completely.

It has been found that prior art mixing valves do not adequately address the potential problems of failure of the thermally responsive control member or thermostat. Moreover, it has been found that these valves do not have such a failure mode in which fluid is still permitted to flow through the valve, albeit it at a reduced flow rate. Moreover, it is believed that no prior art mixing valve provides a mechanism to address the valve failure modes, that does not also severely impact the flow of fluid through the valve under normal operating conditions.

SUMMARY OF THE INVENTION

A thermostatic mixing valve assembly is provided with thermostat failure compensation, or means for responding to the failure of the thermostatic control member. The valve assembly includes a hot and cold fluid inlet, fed to a mixing chamber provided with a fluid outlet. A thermally responsive control member, such as a bellows thermostat, is disposed within the mixing chamber to control the temperature of the outlet fluid. Flow control means are connected to the thermostat for controlling the flow of hot or cold water from their respective inlets into the mixing chamber. The flow control means includes an actuator with a valve disc engaged to the actuator for reciprocating above a hot fluid flow opening. Failure responsive means is provided for substantially restricting the flow of hot fluid into the mixing chamber in the event of a failure of the thermostat.

In one embodiment, the failure responsive means comprises a back-seat that is engaged at the lower end of the actuator operated by the thermostat. The back-seat is disposed on the inlet side of the hot fluid opening, opposite the valve disc. In the normal operating configuration, the back-seat remains clear of the opening so that hot fluid flow is not appreciably affected. However, in the event of a failure of the thermostat, the back-seat is biased upward to close the hot fluid opening, thereby terminating flow of hot fluid through the valve assembly.

DESCRIPTION OF THE PREFERRED EMBODIMENT

Figure 1:
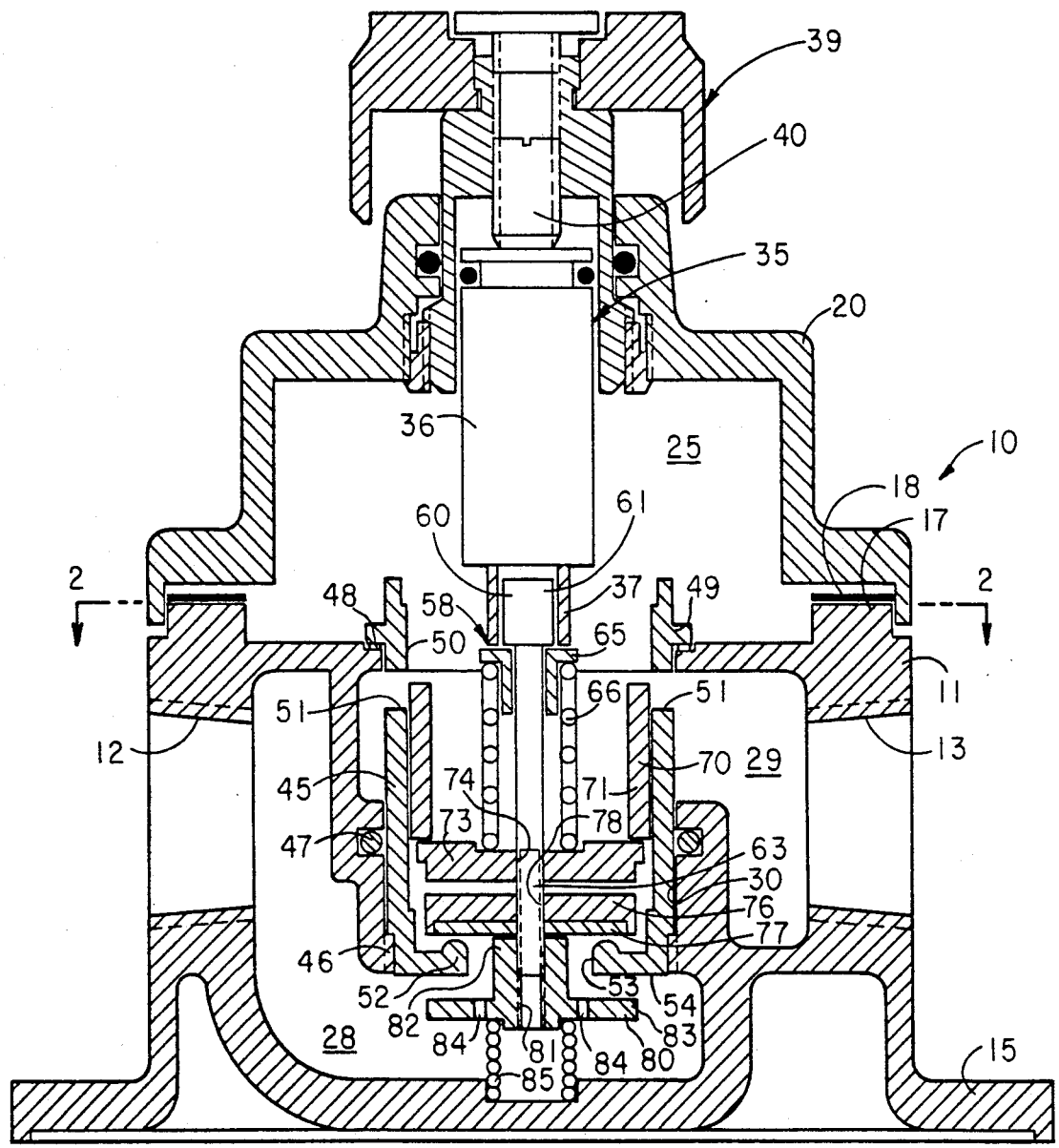
FIG. 1 is a side cross-sectional view of a thermally controlled mixing valve assembly embodying the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A mixing valve assembly 10 according to the preferred embodiment of the present invention is shown in cross section in FIG. 1. The thermostatic mixing valve assembly 10 includes a valve body 11 having a hot water inlet 12, a cold water inlet 13 and an outlet 14

Figure 2:
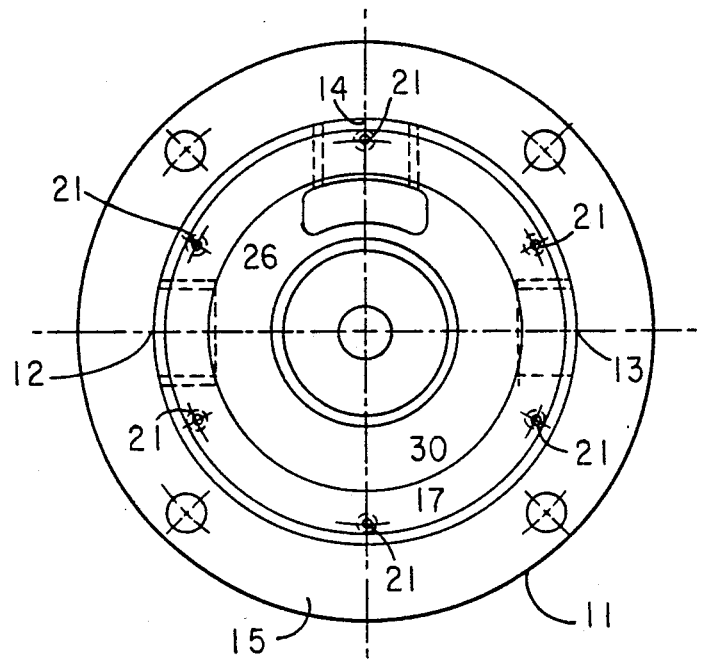
FIG. 2 is a top view of a section of the mixing valve assembly shown in FIG. 1, taken along line 2—2 as viewed in the direction of the arrows.

(FIG. 2). The valve body 11 includes a mounting flange 15 having a bold circle which permits mounting the mixing valve assembly to a mixture. The inlets 12 and 13 and the outlet 14 are threaded to permit engagement with a pipe or threaded tube.

The valve body 11 includes a mounting face 17 on which is placed a gasket 18, which may be composed of rubber or other suitable sealing material. An upper housing 20 is attached to the valve body 11 by way of a bolt circle 21. The gasket 18 is compressed between the mounting face 17 and the upper housing 20 to form a fluid-tight seal. The engagement of the upper housing 20 to the valve body 11 forms a mixing chamber 25 therebetween. The mixing chamber 25 includes an outlet channel 26 which communicates with the outlet 14 of the valve body 11. In operation, hot and cold water flow through their respective inlets 12 and 13 are mixed within the mixing chamber 25 to flow through the outlet channel 26 and outlet 14.

The mixing valve assembly 10 includes a thermally responsive control member 35. In the preferred embodiment, the control member includes a bellows thermostat 36 which can be of well known construction. For instance, the bellows may be formed of stainless steel, brass, or, preferably a phosphor bronze. The bellows is also preferably fluid filled, such as with freon, alcohol, or some other thermally responsive oil. As is well-known with bellows type thermostat, the fluid within the bellows reacts to changes in surrounding temperatures by a change in volume. As the fluid volume changes, the bellows expands or contracts. An actuator sleeve 37 is affixed to the bellows thermostat so that it too extends or retracts in accordance with the thermal response of the bellows thermostat 36.

The control member 35 includes a control knob assembly 39, having an adjustment pin 40 which contacts the top of the bellows thermostat 36 to move the thermostat axially within the mixing chamber 25. The control knob assembly 39 provides for stepless adjustment of the temperature of the outlet fluid, in a manner that is well-known in the art.

As shown in FIG. 1, the hot water inlet 12 includes a channel 28 passing into the valve body 11. Likewise, the cold water inlet 13 includes a cold water channel 29 though the interior of the valve body 11 that is separate from the hot water channel 28. The valve body 11 includes a central cavity 30 that is interposed in fluid communication between the hot water channel 28 and the cold water channel 29. The central cavity 30 opens into the mixing chamber 25.

Figure 3:
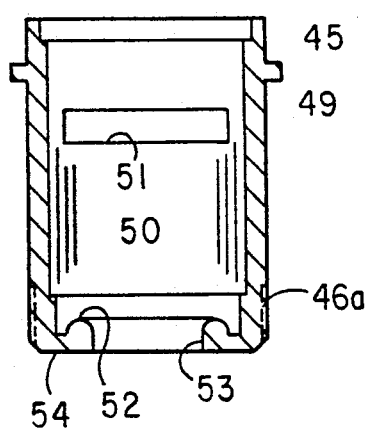
FIG 3 is a cross-sectional view of a liner element of the mixing valve assembly shown in FIG. 1

The mixing valve assembly 10 includes flow control means for controlling the flow of hot and cold water into the mixing chamber. This flow control means comprises a liner 45 disposed within the central cavity 30. The liner 45 is engaged at a threaded portion 46 at the lower end of the central cavity 30, by way of threads 46a (FIG. 3). A seal ring 47 and a gasket 48 held in place by an upper flange 49 of the liner 45, seal the liner within central cavity 30. The liner 45 is threaded tightly into the threaded connection 46 of the central cavity 30 so that a leak proof seal is formed. Thus, fluid passing through the central cavity 30 to the mixing chamber 25 must pass through the interior of the liner 45. The seal ring 47 prevents leakage between the hot and cold water channels 28 and 29, while the gasket 48 prevent leakage from the cold water channel 29 to the mixing chamber 25.

The liner 45 is generally cylindrical in construction with an open top and a partially closed bottom. The liner 45 defines a central chamber 50 bed by a number of slots 51 cut though the liner. In the preferred embodiment, as shown in FIG. 3, two slots are cut in the liner 45 at 180° opposite positions. The slots extend through an approximate 90° arc along the liner cylinder. The slots as shown in FIG. 1, provide communication with the cold water channel 29. At the bottom of the liner 45 forms a valve seat surface 54 having an opening 53 therethrough to provide fluid communication between the central chamber 50 of the liner 45 and the hot water channel 28. An annular ridge 52 is formed around the inner perimeter of the opening 53 toward the interior of the liner 45. The purpose of the annular ridge 52 and valve seat surface 54 will be described herein.

The flow control means of the mixing valve assembly 10 further comprises an actuator assembly 58. The actuator assembly 58 includes a guide post 60 consisting of a rod having an enlarged cylindrical upper end 61 and a threaded lower end 63. A retainer 65 contacts the enlarged end 61 of the guide post 60. The retainer 65 restrains a relief spring 66 which is situated within the actuator assembly 58. The actuator sleeve 37 of the thermally responsive control member 35 contacts the upper surface of the retainer 65 to force the actuator assembly 58 downward as the bellows thermostat 36 expands.

Figure 4A:
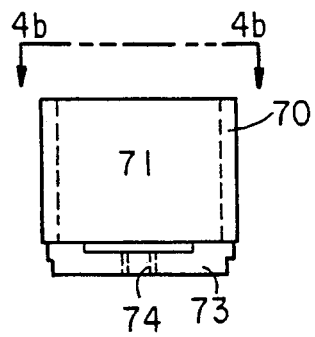
FIG. 4a is a side elevational view of a shuttle element used in the mixing valve assembly shown in FIG. 1.
Figure 4B:
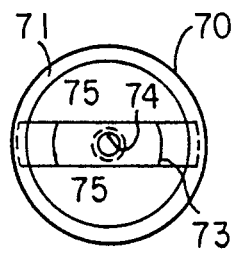
FIG. 4b is a top elevational view of the shuttle element shown in FIG. 4a taken along line 4b—4b as viewed in the direction of the arrows.

The actuator assembly 58 operates to control the displacement of a cylindrical shuttle 70 which is concentrically disposed within the liner 45. The shuttle 70, which is shown in more detail in FIGS. 4a and 4b, includes a piston 71 which is generally on open-ended cylinder. A cross bar 73 extends across the bottom of the piston 71. The cross bar 73 includes a threaded opening 74 into which the threaded end 63 of the guide post 60 is threaded. The cross bar 73 defines a pair of flow opening 75 at the bottom of the shuttle 70 for passage of hot water flowing through the hot water channel 28 and opening 53 into the central chamber 50, on its way to be mixed with the cold water in the mixing chamber 25.

The relief spring 66 of the actuator system 58 acts against the cross bar 73 of the shuttle 70. In the normal condition, the spring 66 is not compressed any more than its initial installed height. However, if the bellows thermostat 36 should expand beyond the hot water shut off point (that is when the liner opening 53 is closed), the actuator sleeve 37 may continue to push against the retainer 65, thereby compressing the relief spring 66.

Immediately below the shuttle 70 and in threaded engagement with the threaded end 63 of the guide post 60, in an adjustable valve disc 76. The valve disc 76 includes a gasket 77 that is mounted at the lower face of the valve disc 76. The disc includes a threaded bore 78 for engagement with the threaded end 63 of the guide post 60. The location of the valve disc 76 relative to the shuttle 70 can be adjusted by threading the disc up or down on the threaded end 63 of the guide post 60. The gasket 77 of the valve disc 76 is adapted to sealingly engage the annular ridge 52 at the interior of the liner 45. Thus, the valve disc 76 provides means for positively shutting off flow of hot water through the opening 53. The relative location of the valve disc 76 can be factory-adjusted before the mixing valve assembly 10 is provided to the ultimate consumer to control the hot water flow rate past the disc.

Figure 5A:
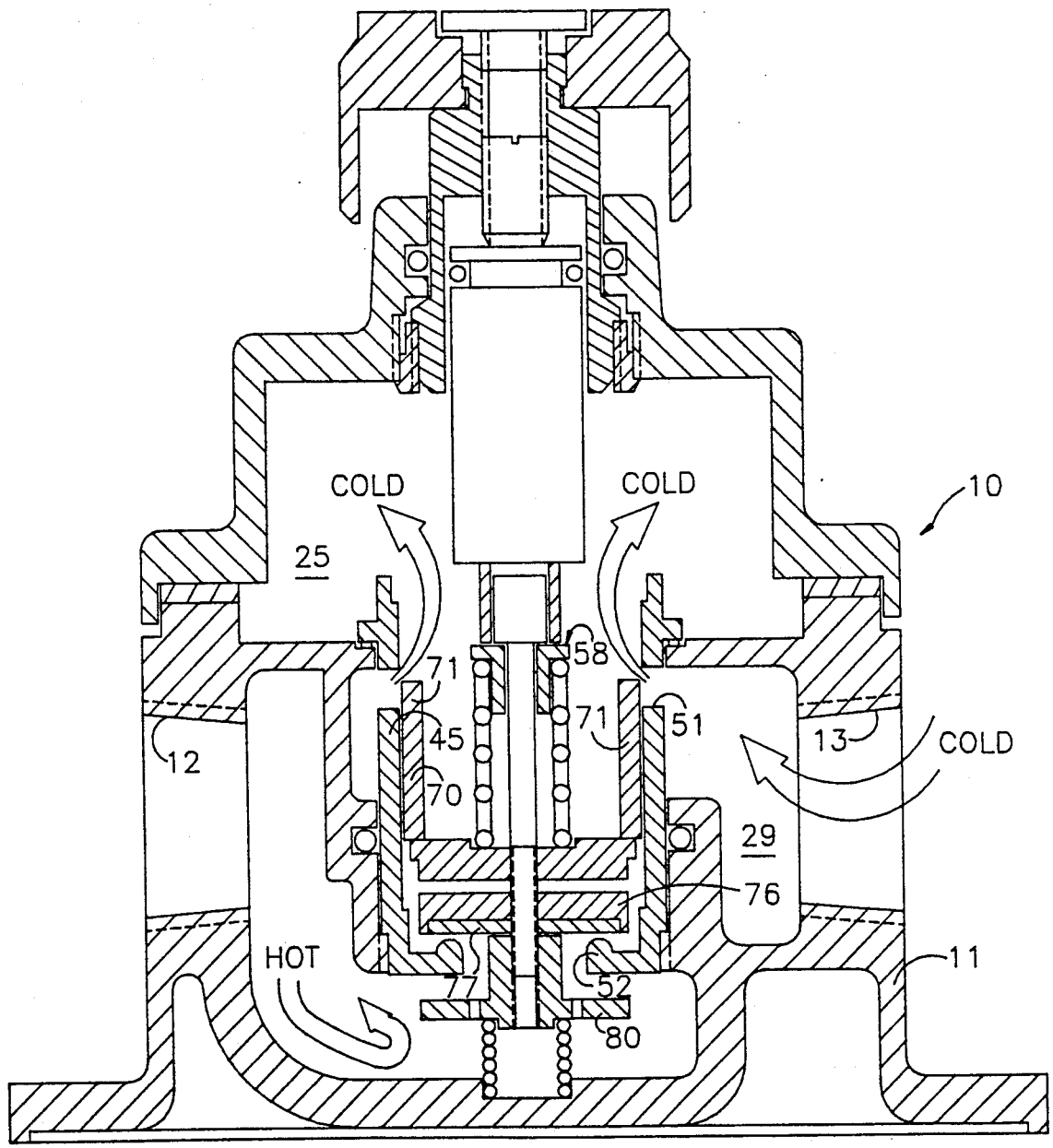
FIG. 5a is a cross-sectional view of the mixing valve assembly shown in FIG. 1 in which the valve is shown in a configuration permitting flow of cold fluid only through the valve.

The components of the mixing valve assembly 10 described thus far form a typical thermostatic mixing valve. In normally operation of the valve, the bellows thermostat 36 of the thermally responsive control member 35, manipulates the shuttle 70 within the liner 45 to vary the amount of hot and cold water flow into the mixing chamber 25. Thus, in the normal operating range, the shuttle 70 will move between positions shown in FIGS. 5a and 5b. In the configuration shown in FIG. 5a, the hot water is completely shut off by the valve disc 76 engaging with the annular ridge 52, thereby closing the opening 53 into the liner 45. In this condition cold water flows through inlet 13, cold water channel 29 and slots 51 of the liner 45. The upper edge of the shuttle 70 does not significantly impinge or close the slots 51 of the liner 45. Thus, the cold water flows freely into the mixing chamber 25 for discharge through the outlet 14 of the valve body 11.

Figure 5B:
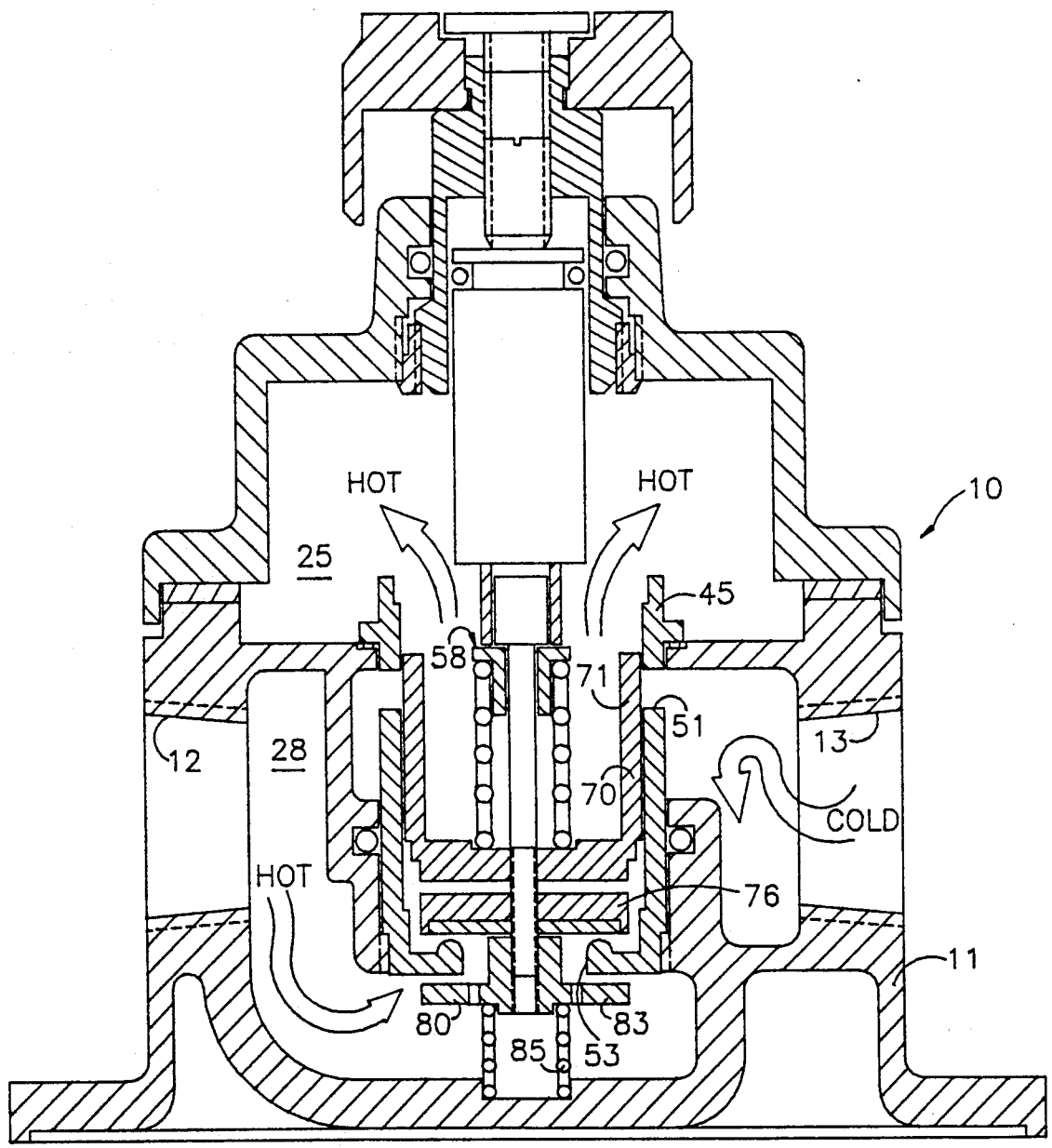
FIG. 5b is a cross-sectional view of the mixing valve assembly shown in FIG. 1 in which the valve is shown in a configuration permitting flow of hot fluid only through the valve.

On the other hand, in the configuration shown in FIG. 5b, the valve disc 76 is disposed away from the annular ridge 52 to permit flow of hot water through the inlet 12 and hot water channel 28, and ultimately through the opening 53. The hot water passing through opening 53 flows through the flow opening 75 around the cross bar 73 and through the interior of the piston 71 into the mixing chamber 25. In this orientation, the bellows thermostat 36 has retracted, along with the actuator sleeve 37 so that the shuttle 70 is permitted to move upward within the liner 45. Hot water flows through opening 53 and into central chamber 51 hydraulically acts against the valve disc 76 to push the shuttle 70 and actuator assembly 58 connected thereto upward until the retainer contacts the actuator sleeve 37. The piston 71 then closes the slots 51 in the liner 45 to substantially limit or stop flow of cold water from cold water channel 29.

Referring again to FIG. 1, an important feature of the invention resides in a back-seat valve member 80 that is connected to the bottom of the guide post 60. The back-seat 80 includes a threaded bore 81 which is engaged to the threaded end 63 of the guide post 60 beneath the valve disc 76. The back-seat 80 includes a cylindrical boss 82 extending from a circular plate 83, with the threaded bore 81 passing therethrough. The boss 82 includes the threaded bore 81 therethrough and provides spacing between the valve disc 76 and the plate 83. In practice, the boss 82 can be threaded onto the guide post 60 so that it contacts the valve disc gasket 77. However, the back-seat 80 can be threaded up or down on the threaded end 63 of the guide post 60 to adjust the amount of gap between the plate 83 and the valve seat surface 54 at the bottom of the liner 45. The valve disc 76 and back-seat plate 83 are on opposite sides of the opening 52.

The back-seat 80 further includes a biasing spring 85 that contacts the base of the plate 83. The spring 85 biases the back-seat upward toward the bellows thermostat 36. The biasing spring 85 operates to force the entire actuator assembly 58, shuttle 70, and valve disc 76 upward as the actuator sleeve 37 of the bellows thermostat 36 retracts. Thus, it is not necessary that the actuator sleeve 37 be fixed to either the enlarged end 61 of the guide post or to the retainer 65 of the actuator assembly 58.

In one specific embodiment of the present invention, the back-seat 80 includes a number of bleed orifices 84 passing through the plate 83. The bleed orifices are situated on the plate 83 so that they are directly beneath the opening 53 in the valve seat surface 54 of the liner 45. The bleed orifices 84 have a very small diameter to permit a highly restricted flow of hot water therethrough. The bleed orifices 84 are not required, however, and their use may depend upon particular application. For example, it may be desirable in certain applications to permit some hot water flow to mix with any cold water that may flow through the valve upon failure of the thermally responsive control member 35.

The boss 82 of the back-seat 80 provides sufficient space between the plate 83 and the valve seat surface 54 and opening 53, so that flow of hot water from the hot water channel 28 is not significantly impeded. If the plate 83 is too close to the valve seat surface 54, flow of hot water through the opening 53 can be too restricted or the pressure drop across the opening 53 too great to permit accurate temperature control. Moreover, the space between the plate 83 and the valve seat surface 54 must also be sufficiently great in a hot-only condition shown in FIG. 5b to permit full flow of hot water through the opening 53.

Figure 5C:
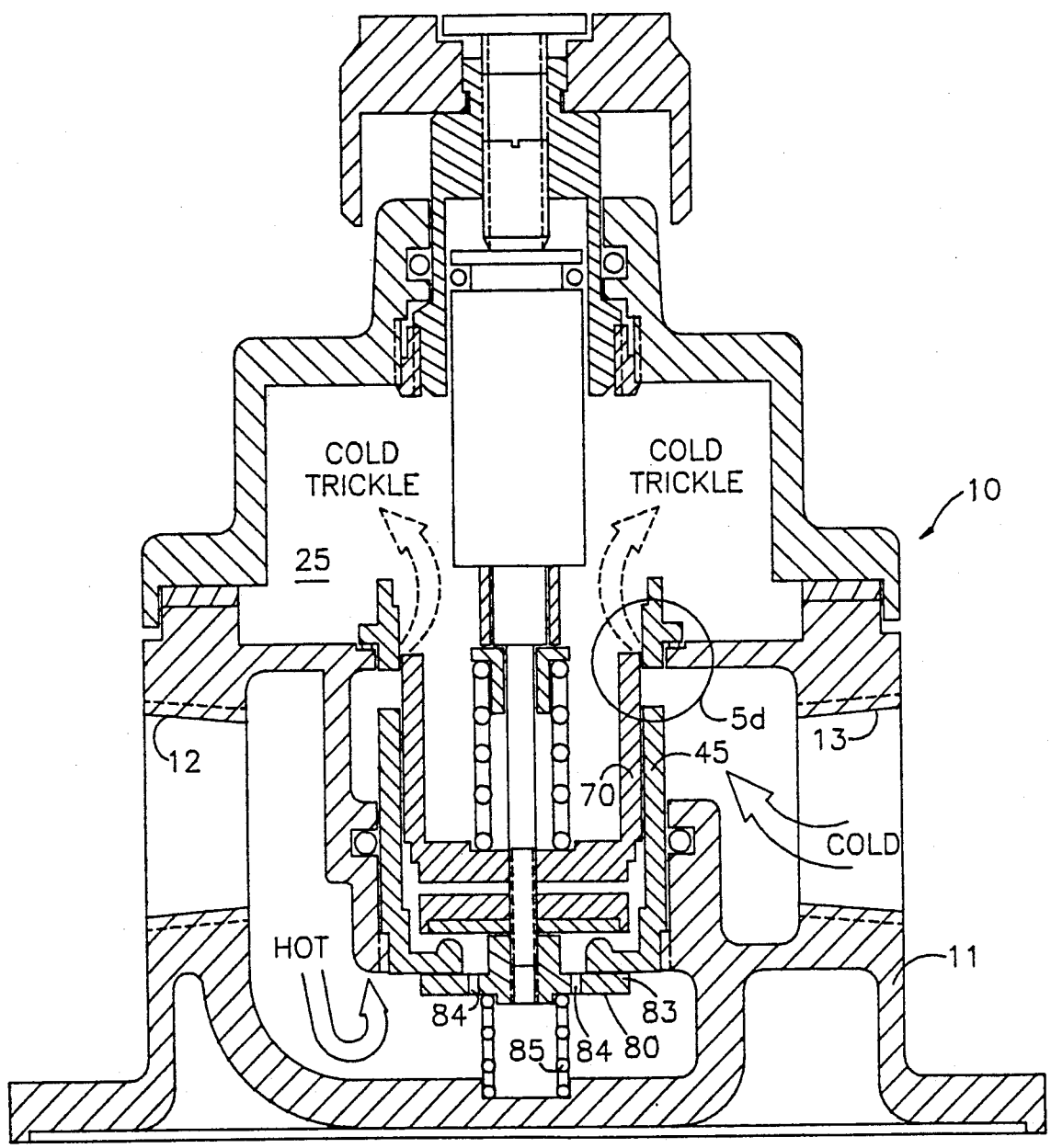
FIG. 5c is a cross-sectional view of the mixing valve assembly shown in FIG. 1 in which the valve is shown in a configuration upon the failure of the thermostatic control element of the valve.

The back-seat 80 form a failure responsive means for the valve assembly 10. Referring to FIG. 5c, the operation of the back-seat 80 is shown in the thermostat failure mode. When the bellows thermostat 36 fails, the actuator sleeve 37 no longer exerts any downward force on the retainer 65 to the actuator assembly 58. In this instance, the thermally responsive control member 35 is no longer able to monitor and maintain the proper temperature of the water leaving the outlet 14. Thus, it is imperative that some failure mode be provided where at least the flow of hot water through the valve is either shut off or greatly reduced. When the bellows thermostat 36 fails, the biasing spring 85 is permitted to push the entire actuator assembly 58 upward. As it does so, the plate 83 of the back-seat 80 is pushed upward into contact with the valve seat surface 54. The force of the biasing spring 85 maintains the plate 83 in sealed contact with the valve seat surface 54 to effectively stop the flow of hot water through the opening 53. If the plate 83 is provided with bleed orifices 84, some flow of hot water is permitted.

In this failure mode, the shuttle 70 is also forced upward, in a manner similar to the configuration for the hot-only condition. In this instance, the shuttle piston 71 will cover the slots 51 of the liner 45. In one version of the mixing valve assembly 10 of the present invention, this eclipsing of the slots 51 by the cylinder 71 effectively stops the flow of cold water into the mixing chamber 25. If the plates 83 of the back-seat 80 does not have bleed orifices, the flow of fluid into the mixing chamber 25 and through the outlet 14 will be completely eliminated.

Figure 5D:
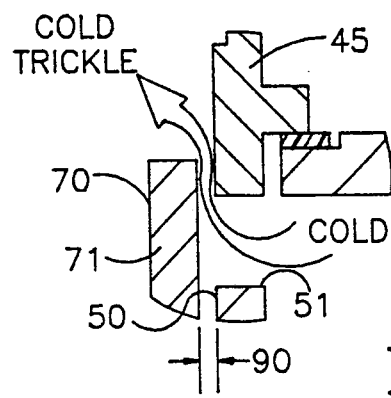
FIG. 5d is an enlarged view of a portion of the valve shown in FIG. 5c, taken from the region labeled FIG. 5d.

However, as discussed above, certain applications of the mixing valve assembly 10 of the present invention requires at least some cold water flow. For instance, the eye-wash application requires some flow, even if it is a trickle, to give the victim the opportunity to finish cleansing his injured eye. Thus, some flow must be permitted through the slots 51 and around the piston 71. In another aspect of the invention, then, as shown in FIG. 5d, the concentrically located piston 71 has a diameter smaller than the inner diameter of the inner chamber 50 of the liner 45. Thus, a gap 90 exists between the shuttle 70 and the liner 45. This gap is calibrated to permit varying degrees of cold water flow or trickle through the slots 51 into the mixing chamber 25. Thus, the inner diameter of the liner 45 can be modified to adjust the gap 90. If a larger cold water trickle is desired, the inner diameter of the liner 45 can be increased to increase the gap 90. On the other hand, if the cold trickle is intended to be virtually eliminated, the inner diameter of the liner 45 can be decreases until it nearly equals the outer diameter of the piston 71. Obviously, the two diameters cannot be identical otherwise the piston 71 could not reciprocate within the liner 45. However, the gap 90 may be very small since the fluid passing through the slots 51 into the gap 90 will naturally provide lubricating for the reciprocating motion of the shuttle 70 within the liner 45.

In the preferred embodiment, all of the working components can be composed of stainless steel or bronze. Thus, for instance, the liner 45, guide post 60, shuttle 70, valve disc 76 and back-seat 80 are all preferably composed of stainless steel. The gasket 77 can be rubber or a neoprene material. The valve body 11 and upper housing 20 can be cast from bronze or other suitable corrosion resistant material. The thermally responsive control member 35 in the preferred embodiment is a bellows thermostat. Coiled tubing may be brazed or soldered to the outside of the bellows thermostat 36 to provide additional heat transfer surface area for the fluid flowing through the bellows. Alternatively, the thermally responsive control member 35 may include some other type of thermostatic device.

The mixing valve assembly 10 just described is capable of 25 gallons per minute flow through the outlet 14. The size of the various components of this mixing valve assembly can be modified to accommodate different flow rates and different hot and cold water pressures depending on the particular application. Likewise, the diameter of the inlets 12 and 13 and outlet 14 can be modified for engagement with different diameter pipes or tubing. While the valve assembly has been described for use with water as the fluid, other fluids may be controlled by the valve assembly of the present invention.

The range of motion of the thermostat 35 can be controlled depending upon the desired temperature range for the outlet fluid. Likewise, the position of the back-seat 80 on the guide post 60 can be varied so that the back-seat 80 will not stop hot water flow when the temperature of the fluid in the mixing chamber 25 is within the operating range of the valve. The spring 85 can be sized according to the thrust capability of the bellows thermostat 36. The spring must not overpower the bellows but it should have sufficient spring force to quickly close the back-seat 80 against the surface 54 when the thermostat fails.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermally controlled mixing valve assembly comprising:
    a valve body defining:
        a hot fluid inlet;
        a cold fluid inlet;
        a fluid mixing chamber; and
        a fluid outlet communicating with said fluid mixing chamber;
    a thermally responsive control member disposed at least partially within said fluid mixing chamber and movable, in a normal operating condition, in response to the temperature of fluid in said mixing chamber;
    flow control means actuated by said control member for controlling the flow of a hot fluid from said hot fluid inlet and a relatively colder fluid from said cold fluid inlet to said fluid mixing chamber in relation to movement of said thermally responsive control member; and
    failure responsive means for substantially restricting flow of the hot fluid from said hot fluid inlet to said mixing chamber upon failure of said thermal responsive control member, said failure means including:
        a first valve member, separate from said flow control means, connected to said control member and disposed between said hot fluid inlet and said mixing chamber, wherein said valve member is movable with said control member in said normal operating condition without substantially restricting flow between said hot fluid inlet and said mixing chamber; and
        biasing means for biasing said valve member to a closed position substantially restricting hot flow between said hot fluid inlet and said mixing chamber upon failure of said control member.

2. The thermally controlled mixing valve assembly of claim 1, wherein said flow control means includes:
    an actuator reciprocatably connected with said thermally responsive control member;
    a second valve member connected to and reciprocatable with said actuator and disposed between said cold fluid inlet and said mixing chamber for restricting flow therebetween;
    a third valve member connected to and reciprocatable with said actuator and disposed between said hot fluid inlet and said mixing chamber for restricting flow therebetween.

3. The thermally controlled mixing valve assembly of claim 2, wherein:
    said flow control means includes a cylindrical liner disposed within said valve body and defining a cold fluid opening in communication with said cold fluid inlet and a hot fluid opening in communication with said hot fluid inlet;
    said second valve member is a piston concentrically disposed and reciprocatable within said liner to close said cold fluid opening;
    said third valve member is a valve disc situated between said mixing chamber and said hot fluid opening and reciprocatable between a position closing said opening and a position permitting hot fluid flow through said hot fluid opening; and
    said first valve member is a back-seat disposed between said hot fluid inlet and said hot fluid opening.

4. The thermally controlled mixing valve assembly of claim 3, wherein said back-seat includes a number of bleed orifices therethrough to permit restricted flow of hot fluid when the back-seat has closed said hot fluid opening.

5. The thermally controlled mixing valve assembly of claim 3, wherein:
    said concentric liner and second valve member define a gap therebetween, said gap being adjustable to permit restricted flow of cold fluid through said gap and into said mixing chamber when said second valve member has closed said cold fluid opening in said liner.

6. The thermally controlled mixing assembly of claim 3, wherein: said flow control means includes;

a liner mounted within said valve body and defining a hot fluid opening between said hot fluid inlet and said mixing chamber; and an actuator extending through said hot fluid opening and reciprocatably connected with said thermally responsive control member and a valve disc engaged to said actuator on one side of said hot fluid opening situated between said mixing chamber and said hot fluid opening; and said first valve member is a back-seat engaged to said actuator opposite said valve disc across said hot fluid opening and disposed between said hot fluid inlet and said hot fluid opening.

* * * * *